April 14, 1942.
F. J. WESTROPE
FOLDABLE VEHICLE TOP
Filed April 9, 1940
2,279,541
3 Sheets-Sheet 1
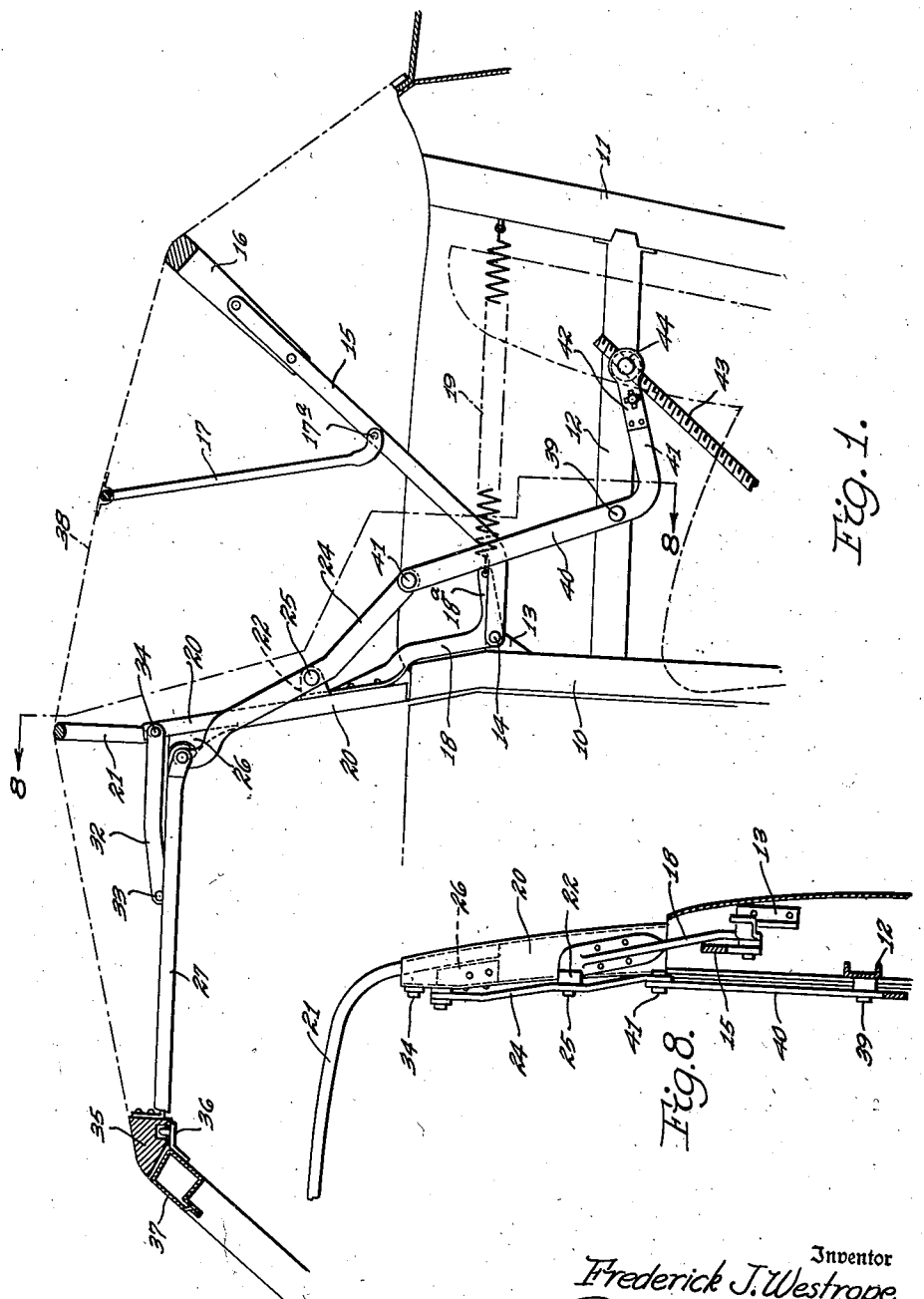
Inventor
Frederick J. Westrope
By
Attorneys

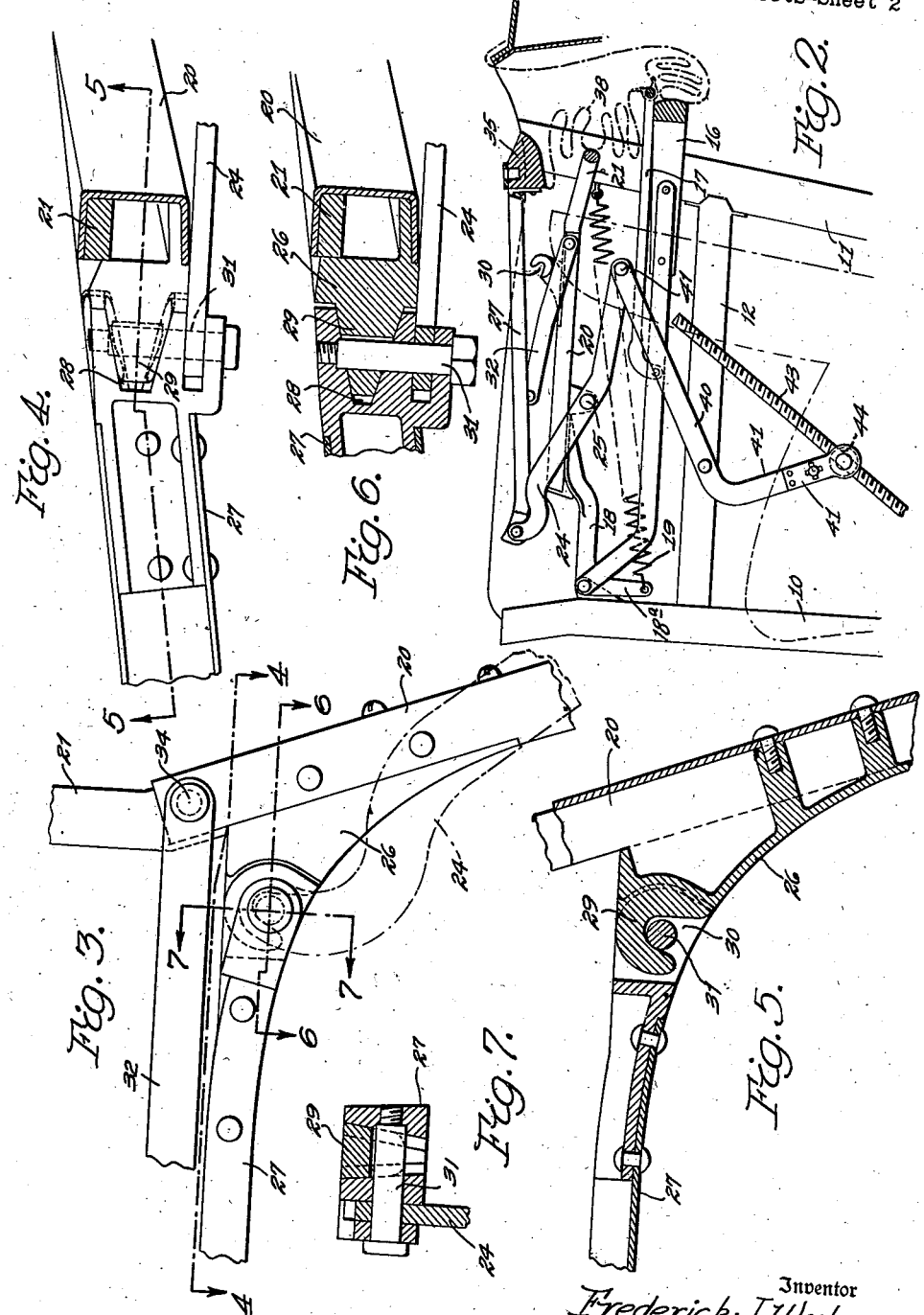

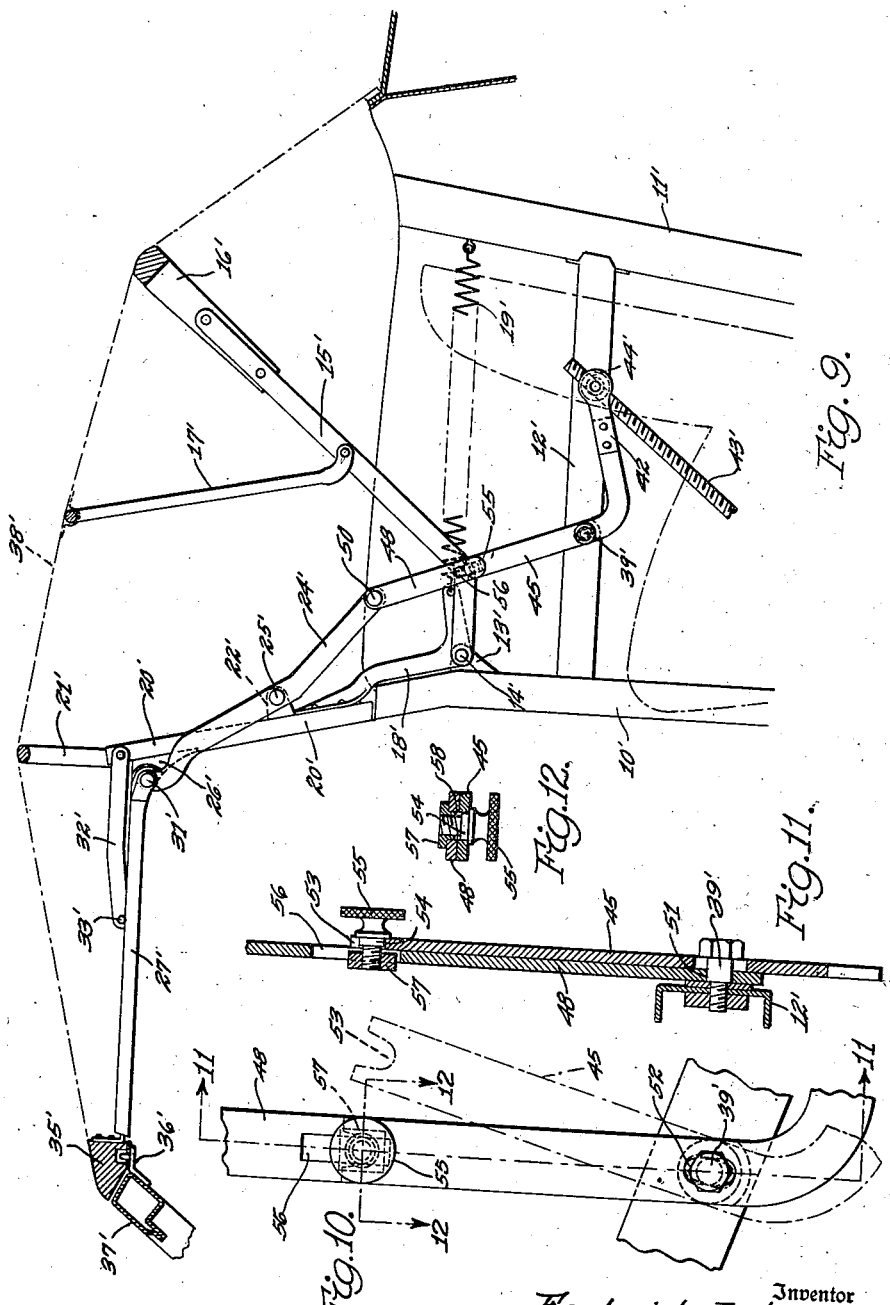

Patented Apr. 14, 1942

2,279,541

UNITED STATES PATENT OFFICE 2,279,541

FOLDABLE VEHICLE TOP

Frederick J. Westrope, Pleasant Ridge, Mich., assignor, by mesne assignments, to Reconstruction Finance Corporation, Detroit, Mich., a corporation of the United States Application April 9, 1940, Serial No. 328,719

2 Claims. (Cl. 296—112)

This invention relates generally to vehicles and more particularly to foldable tops therefor.

It is an object of the present invention to provide a new and improved articulated foldable top for vehicles and of a character such that rattling noises are eliminated.

Another object of the invention is to provide a new and improved anti-rattle joint for a foldable top frame structure.

Another object of the invention is to provide for a foldable top comprising two side, articulated frame structures, provision for adjusting such structure relative to separate operating members so that such structures may fold and open together and thus substantially equally bear the strains in the raising and lowering of the top and also in the raised position of the top.

A further object of the invention is to provide a new and improved top structure of the above mentioned character having provision for quickly and easily disconnecting the top structure from the operating means thereof so that the top may be raised and lowered manually, if desired.

Other objects of the invention will become apparent from the following detailed description taken in connection with the accompanying drawings in which:

Figure 1 is a view taken longitudinally and vertically through a motor vehicle body to show one, articulated side frame structure of a foldable top, which structure is duplicated on the opposite side of the top;

Fig. 2 is a fragmentary view of the motor vehicle body showing the positions the parts of the top frame assume when the top is in its lowered position;

Fig. 3 is an enlarged fragmentary view of the top structure illustrating an articulated and improved joint thereof;

Fig. 4 is a view partly in elevation and partly in section taken along the line and in the direction of the arrows 4—4 of Fig. 3;

Fig. 5 is a view shown in longitudinal section taken along the line and in the direction of the arrows 5—5 of Fig. 4;

Fig. 6 is a sectional view of the joint taken along the line and in the direction of the arrows 6—6 of Fig. 3;

Fig. 7 is a fragmentary sectional view of the joint taken along the line and in the direction of the arrows 7—7 of Fig. 3;

Fig. 8 is a fragmentary cross sectional view of the body taken along the line and in the direction of the arrows 8—8 of Fig. 1;

Fig. 9 is a view similar to Fig. 1 showing the modified form of the invention;

Fig. 10 is an enlarged fragmentary view of certain structural details of the top shown in Fig. 9;

Fig. 11 is a sectional view taken along the line and in the direction of the arrows 11—11 of Fig. 10; and Fig. 12 is a detail view of an adjustment means taken along the line and in the direction of the arrows 12—12 of Fig. 10.

Referring to the drawings by characters of reference and first to Figs. 1 to 8 inclusive, there is shown in part a motor vehicle body including fixed, oppositely disposed, intermediate posts or body pillars 10 and a pair of oppositely disposed, rear body posts or pillars 11, the posts 10 and 11 of corresponding sides of the body being rigidly secured together by longitudinally extending body frame members 12. Rigidly secured to each of the posts 10 there is a bracket 13, and pivoted respectively to each of the brackets, as at 14, there is a rear top frame member 15, the frame members 15 supporting and being joined together by a rear top cross bow 16. An intermediate cross bow 17 is provided and at its lower downturned ends is pivoted, as at 17ª, to and preferably between the ends of the pivoted frame members 15. Also pivoted to each of the brackets 13, there is a lever 18, and rigidly secured to the upper end of each of the levers 18 there is a channel-shaped member 20, the members 20 serving as upper extensions of the fixed intermediate pillars 10 when the top is in its raised position, as shown in Fig. 1. Secured in and to the upper ends of the channel-shaped extension members 20 there is a front cross bow 21. The levers 18 are each provided with an arm 18ª to each of which is secured a helical coil spring 19 which may be anchored respectively to the rear pillars 11, the springs 19 opposing lowering of the top to steady the movement thereof.

As shown in Fig. 1, each of the extension members 20 is provided with a rearwardly extending boss 22, and pivoted intermediate their ends and respectively to each of the bosses 22 there is a lever member or link 24. The lever members 24 may be pivoted to the bosses 22 by pivot pins 25 or by any other suitable means. Carried by each of the channel-shaped members, adjacent the upper ends thereof is a socket member 26 each of which comprises a part of a readily separable joint or connection between the lever members 24 and frame members 27 respectively, which members 27 extend longitudinally of the body when the top is in its raised position. As shown in detail in Figs. 4 and 6 of the drawings, the longitudinally extending frame members 27 are each provided in the rear ends thereof with a socket or V-shaped slot or recess 28 in which are respectively received tapered extended portions 29 of the socket members 26, the sides of the extended portions tending to converge toward their outer ends. In addition, the extended portions 29 are wedge-shaped cross sectionally or transversely, the sides thereof tending to converge downwardly, as shown in Fig. 7. The opposite side wall surfaces defining the sockets 28 also tend to converge downwardly such that the sockets are substantially complementary to the extended portions 29 received therein to effect a wedging action between the parts. The V-shaped extended portions 29 wedge into the V-shaped slots 28, providing for slack or clearance take-up downwardly and longitudinally of the frame structure, thus providing an anti-rattle joint of a character which will continuously compensate for and take up any slack in the articulated top frame structure due to wear of the parts or due to any other cause. The extended portions 29 are hook-like in form (see Fig. 5) providing sockets 30 which, when the top is in its raised position, face downwardly and hook over catch members, preferably transverse pins 31 by which the upper ends respectively of the levers 24 are pivotally connected respectively to the longitudinally extending frame members 27. As shown in Fig. 6, the pins 31 extend transversely and respectively through the sockets 28 of the members 27 and may be screwthreaded or otherwise suitably secured to the members 27. Referring again to Fig. 5, the wall surface defining the sockets 30 is formed such that it has a wedging or camming action on the pins 31. Or, in other words, the curvature of the wall defining the sockets 30 is made such that the pins 31 will not fully seat in the sockets but instead will engage the forward side wall surface thereof, as illustrated in Fig. 5. With this construction it will be noted that slack in the articulated top frame structure is at all times taken up for the purpose of preventing rattling noises which are usually due to clearances in the various pivoted connections of the top structure and which increase in time due to wear of the parts.

The longitudinally extending frame members 27 are respectively and pivotally connected to the pillar extension members 20 by links 32 of which the forward ends are pivoted, as at 33, to and intermediate the opposite ends of the member 27 and of which the rear ends are pivoted, as at 34, to and adjacent the upper ends of the extension members 20. Rigidly secured to the forward ends of the frame members 27, there is a wind shield header member 35 which, when the top is in its raised position, seats on brackets 36 which may be rigidly secured to the wind shield frame, designated by the numeral 37. Any suitable means for detachably securing the header 35 to the brackets 36 may be provided. As indicated by the dot and dash line of Fig. 1, a foldable top covering 38, which may be of any suitable leak-proof fabric, covers the frame of the top and is suitably attached to the header member 35 and to each of the cross bows 21, 17 and 16. It will be understood that, when the top is in its raised position, the cross bows 16 and 17 are held up solely by the top covering 38.

Pivoted to each of the body frame members 12 by suitable pivot members 39, there is an operating lever 40, and these operating levers 40 are pivoted adjacent their upper ends 41 respectively to the lower ends of the levers 24. Each of the levers 40 is provided with a lower arm 41 having a pair of spaced plate members 42 rigidly secured thereto. The plate members 42 constitute extensions of the arms 41 and each pair rotatably support therebetween a traveler member or nut 44 which are screwthreaded respectively onto rotatable driven shafts 43, only one of which is shown. Any suitable power means, such as a reversible electric motor may be employed to drive or to rotate the shaft 43, and upon rotation of the shafts the traveler members or nuts 44 move longitudinally of the shafts and pivot the operating levers 40 to raised or lower the top.

*Operation*

In lowering the vehicle foldable top, the threaded shafts 43 are rotated together in one direction, and the follower members or nuts 44 are caused to move downwardly on the screws, which movement pivots the operating levers 20 clockwise, as seen facing Fig. 1. The links or levers 24 are moved rearwardly, carrying the upper pillar extension 20 therewith which breaks the joints between the socket members 26 and extensions 27. In the breaking of the joints, the levers 24 and the frame members 26 pivot simultaneously, the levers 24 pivoting counterclockwise and the members 27 pivoting clockwise during which time the levers and members 27 are also being moved bodily rearwardly together. The rear bow supports 15, which are held up solely by the top covering to which the bow 17 is also attached, swings downwardly by gravity, followed by the intermediate bow 17, carried thereby. As the links 24 continue to move rearwardly and downwardly, the pillar extensions 20 swing about the pivots 14 which causes the members 27 to continue to move rearwardly while at the same time swinging clockwise about the pivots 33. The levers, links and other parts continue moving rearwardly and simultaneously swinging about their pivots as above described until finally they assume the folded top, lowered positions shown in Fig. 2. To raise the top, the shafts 43 are rotated in the opposite direction to pivot the operating levers 40 counterclockwise, the movements of the various top frame parts being reversed in direction from the movements they make in lowering the top. Just prior to completion of the top raising operation, the tapered extended portions 29 of the socket members 26 automatically hook over the catch members or pins 31 and wedge in the sockets 28 provided in the rear ends of the longitudinal frame members 27. When the top is lowered, the springs 19 are tensioned which aids in steadying the movement of the top and the force stored in the springs aids in raising the top.

Referring now to the modification shown in Figs. 9 to 12 inclusive, it will be seen that certain of the top structure parts are the same as parts of the top structure of Fig. 1 and, therefore, have been given prime numerals to avoid unnecessary repetition of description. As shown in Fig. 8, a pair of operating levers 45 are pivoted, as at 39', respectively to the opposite body side frame members 12', the levers 45 each having an arm 46 for connection respectively to rotatable driven shafts 43'. Carried by and adjacent the end of each of the lever arms 46, an internally threaded follower member or nut 47 is provided, these follower members being screwthreaded respectively onto threaded rotatable shafts 43'. Each of the levers 45 is provided with an adjustable, upwardly extending extension arm 48 which is pivoted, as at 50, adjacent their upper ends respectively to the lower ends of the levers 24'. Adjacent their lower ends, the extension arms 48 are each provided with an aperture to receive the pivot pins 39' respectively, the levers 48 being provided with elongated slots 52 to receive the pivot pins 39' to provide for adjustment movement of the levers 45 and of the extension arms 48. The upper ends of the levers 45 are notched or recessed, as at 53, to receive the shanks 54 respectively of thumb screws 55 which extend through slots 56 provided respectively in the extension arms 48. Screwthreaded onto the screws 55 are nuts 57 having extended, opposite flat sided portions 58 which extend into the slots 56 to prevent turning of the nuts. It will be seen that, when the desired adjustment of the lever 45 and their arms 48 have been made, the thumb screws 55 may be tightened down to rigidly secure the levers and their arms in the desired adjusted positions. By adjusting the levers 45 and their extension arms 48 proper movements together of the parts of the two side frame structures of the top may be obtained so that all of the strain will be substantially equally divided between such structures. It will also be seen that, by loosening the screws 39' and the thumb screws 55, the lever 45 and their extension arms 48 may be moved longitudinally and relative to each other to disengage the recessed ends 53 of the levers 45 from the thumb screws 55. Thus, the extension arms 48 may be quickly and easily released from their levers 45 and, by so releasing the extension arms, it will be seen that the top may be raised or lowered manually if desired.

It will now be appreciated that I have provided new and improved foldable top structure of a character in which rattling noises are eliminated, particularly in the raised position of the top. Further, I have provided improved readily separable joint connections between certain parts of the foldable top structure whereby they may be quickly and easily disengaged to permit manual raising and lowering of the top if desired, or necessary.

While I have shown and described my invention in detail it is to be understood that the same is to be limited only by the appended claims for many changes may be made without departing from the spirit and scope of the invention.

What I claim is:

1. In a vehicle body having oppositely disposed intermediate pillars, side frame members pivoted to the body and joined together by a cross bow rearwardly of the pillars, extension members respectively for the pillars and pivoted to the body, a pair of lever members pivoted intermediate their ends and respectively to and intermediate the ends of said extension members, said lever members in the raised position of the top having upper hooked end portions providing downwardly facing socket engaging members, a pair of longitudinally extending frame top members having sockets respectively to receive said lever members, link members pivotally connected respectively to and intermediate the ends of said frame members and to said extension members, and a pair of operating levers pivoted to the body and to the lower ends respectively of said first-named lever members.

2. In a vehicle body having oppositely disposed intermediate pillars, side frame members pivoted to the body and joined together by a cross bow rearwardly of the pillars, extension members respectively for the pillars and pivoted to the body, a pair of lever members pivoted intermediate their ends and respectively to and intermediate the ends of said extension members, the fulcrums of said levers being offset from said extensions, said lever members in the raised position of the top having upper hooked end portions providing downwardly facing socket engaging members, a pair of longitudinally extending frame top members engaging in said sockets respectively of said lever members, link members pivotally connected respectively to and intermediate the ends of said frame members and to said extension members, a pair of operating levers pivoted to the body and to the lower ends respectively of said first-named lever members, and spring means acting on said first-named lever members and opposing movement thereof by said operating lever members.

FREDERICK J. WESTROPE.